United States Patent [19]

Gauthier et al.

[11] Patent Number: 5,311,696
[45] Date of Patent: May 17, 1994

[54] DEVICE FOR ATTRACTING AND KILLING FLEAS

[76] Inventors: Betty Gauthier, 2222 6th St., S.W. Akron, Ohio 44314; Paul Terwilliger, 844 Indian Trail, Akron, Ohio 44314

[21] Appl. No.: 59,065
[22] Filed: May 10, 1993
[51] Int. Cl.⁵ ............................................. A01M 1/04
[52] U.S. Cl. .................................................. 43/113
[58] Field of Search ............... 43/113, 114, 115, 116, 43/117, 107, 125

[56] References Cited

U.S. PATENT DOCUMENTS

| | | | |
|---|---|---|---|
| 1,074,837 | 10/1913 | Cook | 43/113 |
| 3,348,332 | 10/1967 | O'Connell et al. | 43/113 |
| 4,332,100 | 6/1982 | Schneider | 43/113 |
| 4,366,643 | 1/1983 | Boaz | 43/113 |
| 4,486,974 | 12/1984 | Yavnieli | 43/113 |
| 4,566,220 | 1/1986 | Justice | 43/113 |
| 4,907,366 | 3/1990 | Balfour | 43/114 |
| 4,908,977 | 3/1990 | Foster | 43/114 |
| 5,095,648 | 3/1992 | Keenan | 43/136 |
| 5,142,815 | 9/1992 | Birdsong | 43/113 |

Primary Examiner—P. Austin Bradley
Assistant Examiner—Chuck Y. Mah
Attorney, Agent, or Firm—S. Michael Bender

[57] ABSTRACT

A device for attracting and killing fleas and other insects and bugs has a light for attracting the insects and a shallow reservoir of soapy water which the insects fall into causing them to drown. The soapy water can be replaced as often as is necessary or desired.

4 Claims, 4 Drawing Sheets

DEVICE FOR ATTRACTING AND KILLING FLEAS

BACKGROUND OF THE INVENTION

1. Field of the Invention

The present invention relates generally to insect traps, and more particularly, to a device for attracting and killing fleas and the like.

2. Description of the Prior Art

Fleas and other insects and bugs often get into unwanted places such as homes. The insects and particularly fleas, are many times brought in by household pets.

Traps for fleas and other insects which use light to attract the insects and a sticky surface to trap them are well known in the prior art (see the following U.S. patents for examples: U.S. Pat. No. 4,117,624; U.S. Pat. No. 4,654,998; U.S. Pat. No. 4,700,506; and U.S. Pat. No. 5,044,112).

The above prior art insect traps use sticky surfaces to trap the insects. Thus insects which are trapped will be stuck on the surfaces until the surfaces are disposed of, which may be days or weeks depending upon how many bugs are trapped. Having dead bugs stuck on a trap in someone's home for days or weeks is not desirable. What is needed is a relatively inexpensive way to attract insects and dispose of them frequently without also disposing of expensive sticky surfaced materials.

Thus, while the foregoing body of prior art indicates it to be well known to use lights to attract fleas and insects, the provision of a more simple and cost effective device is not contemplated. Nor does the prior art described above teach or suggest a flea attracting and killing device which may be used by individuals to attract fleas and other insects with a light and trap the insects in such a way that the insects can be disposed of frequently in an inexpensive way. The foregoing disadvantages are overcome by the unique device for attracting and killing fleas and the like of the present invention as will be made apparent from the following description thereof. Other advantages of the present invention over the prior art also will be rendered evident.

SUMMARY OF THE INVENTION

To achieve the foregoing and other advantages, the present invention, briefly described, provides a device for attracting fleas and other insects and bugs having a light for attracting the insects and a shallow reservoir of soapy water which the insects fall into causing them to drown. The soapy water can be replaced as often as is necessary or desired.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved device for attracting and killing fleas and the like which has all of the advantages of the prior art and none of the disadvantages.

It is another object of the present invention to provide a new an improved device for attracting and killing fleas and the like which may be easily and efficiently manufactured and marketed.

It is a further objective of the present invention to provide a new and improved device for attracting and killing fleas and the like which is of durable and reliable construction.

An even further object of the present invention is to provide a new and improved device for attracting and killing fleas and the like which is susceptible of a low cost of manufacture with regard to both materials and labor, and which accordingly is then susceptible of low prices of sale to the consuming public, thereby making such device for attracting and killing fleas and the like available to the buying public.

Still yet a further object of the present invention is to provide a new and improved device for attracting and killing fleas and the like having a light for attracting fleas and other insects and bugs to the device.

It is still a further object of the present invention to provide a new and improved device for attracting and killing fleas and the like having a reservoir or pool of soapy water which the fleas or other insects or bugs fall into and drown.

Still a further object of the present invention is to provide a new and improved device for attracting and killing fleas and the like which can be used as a night light or planter during times of the year when fleas or insects or other bugs are not a problem.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a new and improved device for attracting and killing fleas and the like embodying the principles and concepts of the present invention will be described.

Figure 1:
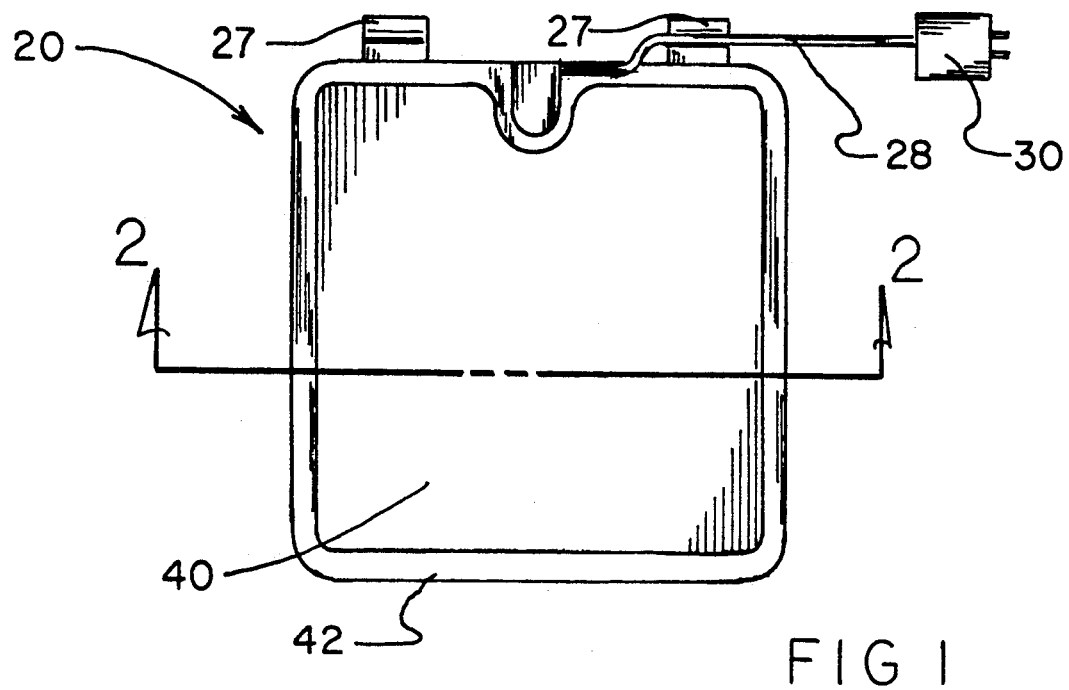
FIG. 1 is a top view from above showing the first preferred embodiment of the device for attracting and killing fleas and the like of the present invention.
Figure 2:
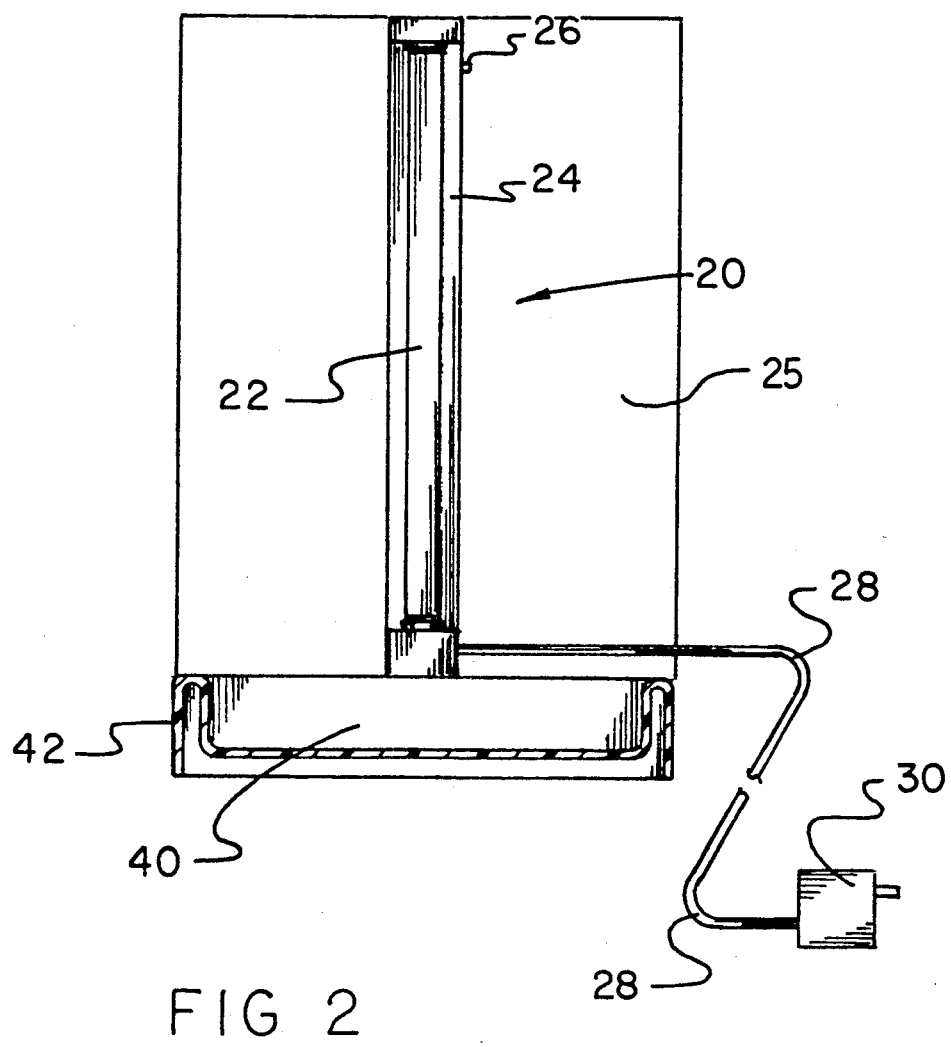
FIG. 2 is a cross-sectional elevational view of the device for attracting and killing fleas and the like along line 2—2 of FIG. 1.
Figure 3:
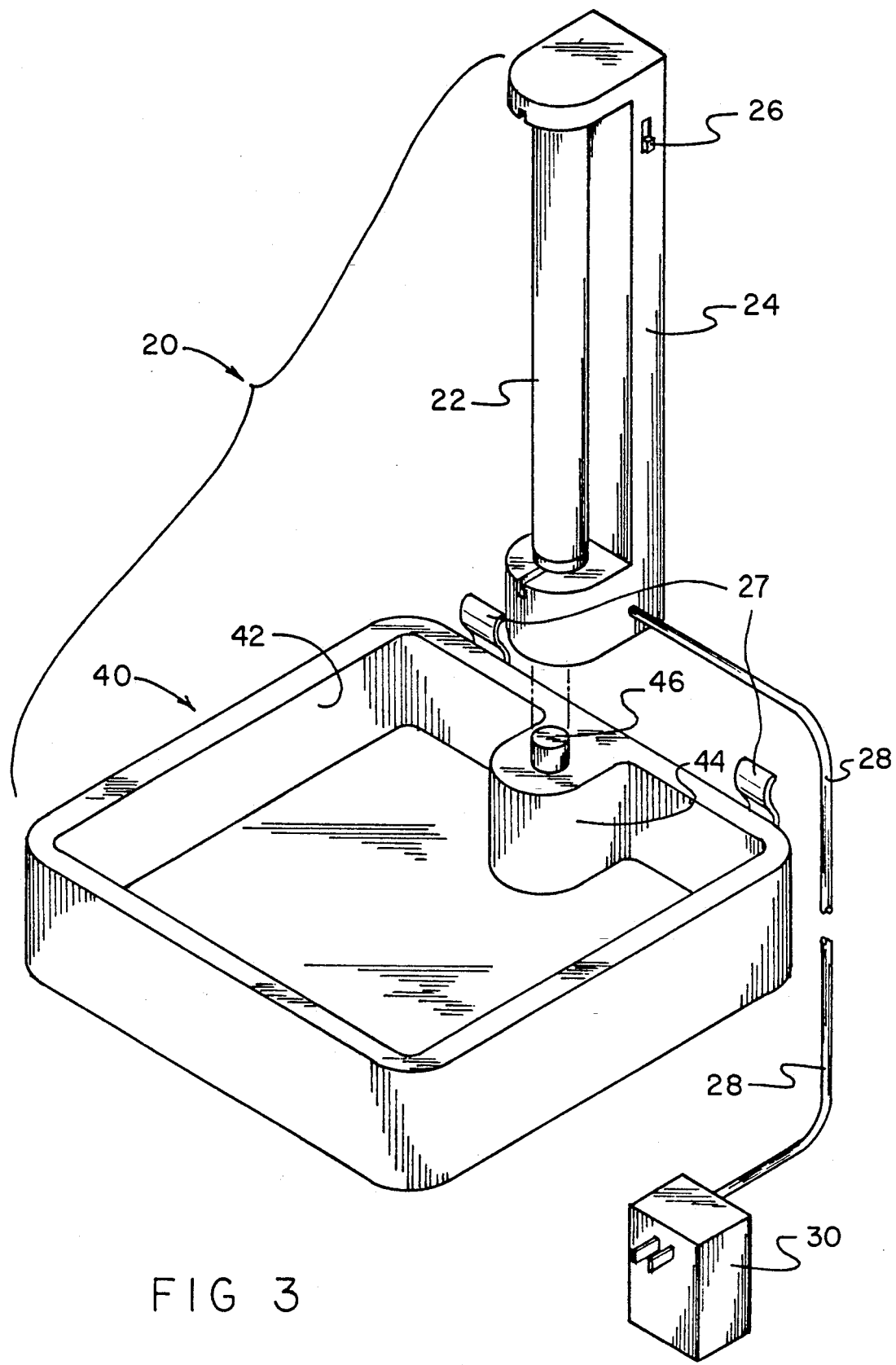
FIG. 3 is a perspective view in elevation of the device for attracting and killing fleas and the like of FIGS. 1 and 2.

Turning initially to FIGS. 1-3, there is shown a first exemplary embodiment of the device for attracting and killing fleas and the like of the invention generally designated by reference numeral 20. In its preferred form, the device for attracting and killing fleas and the like 20 comprises generally a light 22 which is preferably of the fluorescent type and a base 24 for supporting the light 22. The base 24 is preferably made of a material or coated with a material which reflects the light 22 magnifying the lights magnitude. An on/off switch 26 can be used to turn the light 22 on and off. Electricity is preferably supplied by a standard AC wall socket using a typical electrical plug 30 and electrical cord 28 to bring the electricity to the device 20.

The flea attracting and killing device 20 is further comprised of a reservoir (or shallow pool) 40 which can be preferably be filled with soapy water (e.g. conventional liquid or granulated detergent mixed with water) because of the relative low cost of such water/detergent solution (although other effective liquids can be used, likely at greater expense, if so desired). The reservoir 40 has a retaining wall 42 with a jutting out section 44 for supporting the light base 24. A knob 46 atop the jutting out section 44 can be used for holding light base 24.

The flea and other insect attracting and killing device 20 works very simply to control the flea population in a household. At night, or at any time when it is desired to trap fleas and the like, the light 22 is turned on by switch 26, immediately attracting fleas and the like. When the fleas (or other insects or bugs) come to the light 22 they fall into the reservoir 40 where they come into contact with the soapy water solution and quickly drown. When an undesirable amount of dead fleas have accumulated in the soapy water, the water can be easily disposed of and a new (flealess) solution of water/detergent can be added. During times of the year when fleas and other insects and other bugs are not a problem, the device 20 can be used as a night light or as a planter.

A backboard 25 of suitable material such as plastic (PVC) sheet for example, may be placed behind base 24 substantially as shown in FIG. 2. When the fleas are attracted to the light and jump at it, they will hit the backboard and fall into the reservoir. A pair of spring clips 27 suitably affixed to the rear of reservoir 40 may be used to support backboard 25 in the position shown in FIG. 2.

Figure 4:
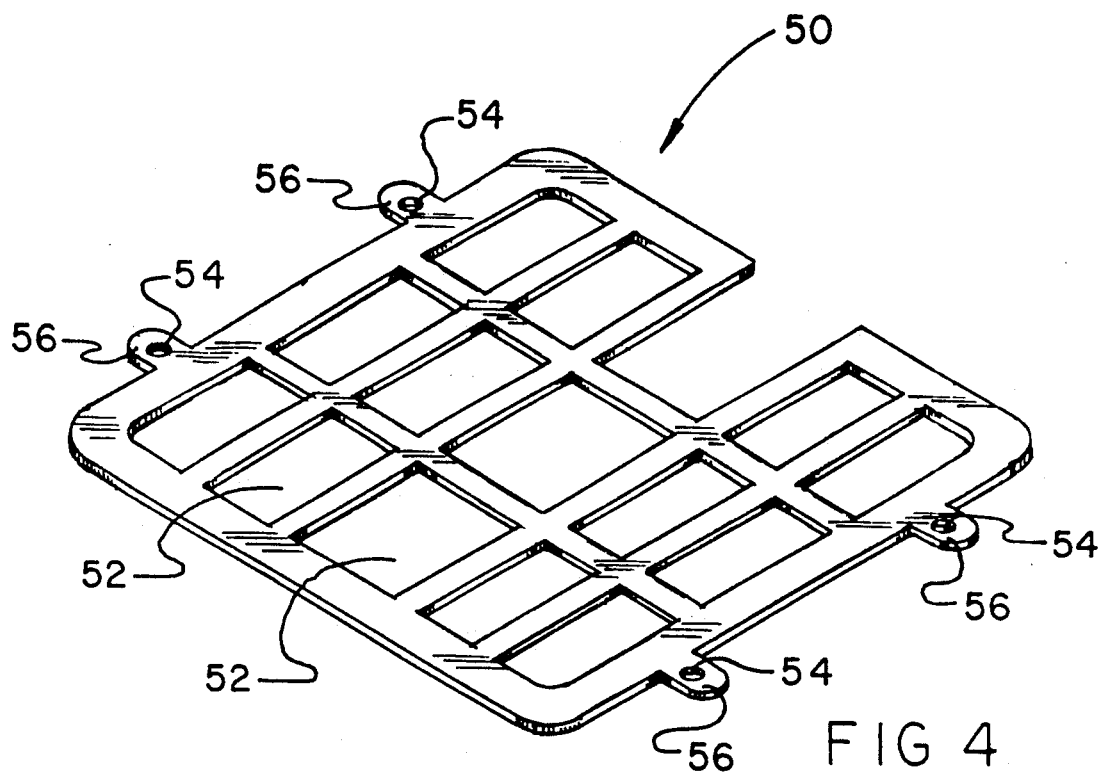
FIG. 4 is a perspective view in elevation of a grate which can alternatively used as part of the present invention.

Referring now to FIG. 4, a grate 50 can alternatively be used as part of the present invention to keep animals from drinking the soapy water solution. The grate 50 has holes 52 too small for animals such as dogs and cats to be able to drink through. Four knob holes 54 in tabs 56 jutting out from the grate 50 are used to position the grate over the reservoir.

Figure 5:
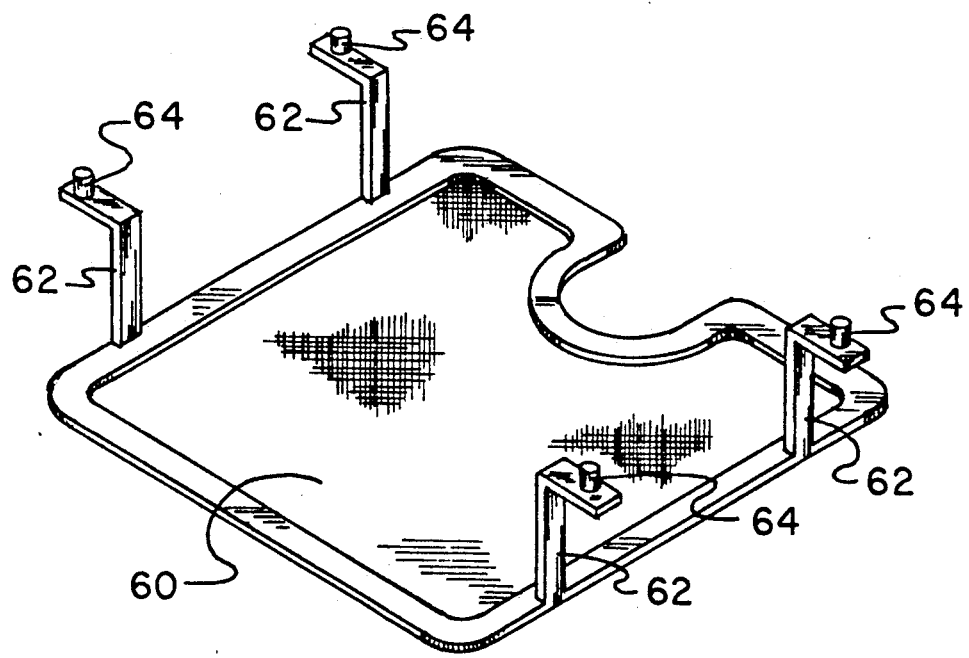
FIG. 5 is a perspective view in elevation of a screen which can alternatively used as part of the present invention.

Referring now to FIG. 5, another part which can alternatively be used as part of the present invention is a screen 60 to sift fleas. Larger insects and the like will not pass through the screen 60. The screen 60 has support legs 62 and four knobs 64. The screen 60 can be used when it is desired only to kill fleas and not other insects and bugs.

Figure 6:
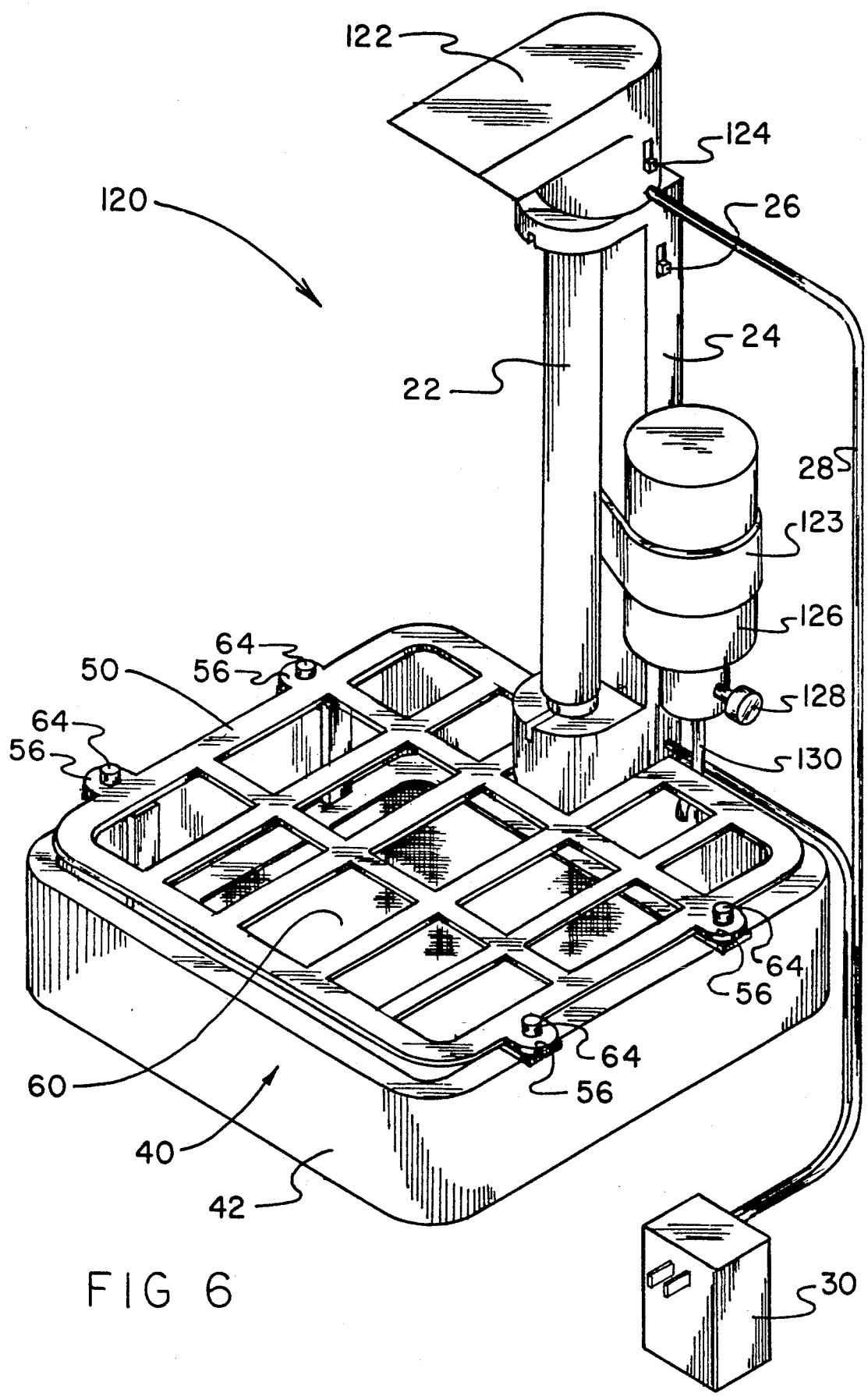
FIG. 6 is a perspective view in elevation of an alternative preferred embodiment of the present invention.

An alternative embodiment device 120 for attracting and killing fleas and the like utilizing the previously described grate 50 and screen 60 is shown in FIG. 6. The alternative embodiment further comprises a heater/blower 122 for assisting the attracting of fleas and the like. The heater/blower provides heat and blows it to where passing bugs will feel it. The heater/blower can be used with or without a light 22. In the FIG. 6 embodiment the heater/blower is shown atop the light base 24. The heater/blower 122 preferably has a separate on/off switch 124.

The alternative embodiment of FIG. 6 further comprises a soap dispenser 126 for making the water in the reservoir 40 soapy so that fleas will die quicker. The soap dispenser 126 has an open/close valve 128 and an exit tube 130. A support 132 can also be provided for holding the soap dispenser to the light base 24.

The alternative embodiment device 120 works the same as the first embodiment of the device 20 with a few additions including that only small insects like fleas pass through the screen 60 and animals such as dogs and cats can't drink the water out of the reservoir 40 because of the grate 50. Also the heater/blower 122 can be used in conjunction with the light 22 to help attract fleas. The heater/blower 122 can also be used alone to attract fleas and the like when it is desired to not have any lights on (for example at night during sleeping hours). Additionally, the addition of a liquid soap compound to the water in the reservoir can be facilitated in accordance with the present invention by using liquid soap dispenser 126. Adding soap to the water not only assures that the fleas will be killed upon contact with the water more quickly, but furthermore, renders the water and the reservoir 42 more sanitary.

It is apparent from the above that the present invention accomplishes all of the objectives set forth by providing a new device for attracting and killing fleas and the like comprising: at least one means for attracting fleas and the like; a liquid retaining means below the at least one means for attracting fleas and the like; whereby fleas and the like which are attracted to the at least one attracting means can fall into the liquid retaining means where they drown. The at least one means for attracting fleas and the like can be a light providing means. A reflecting means can be used for increasing the magnitude of light provided by the light providing means. The light providing means can be a fluorescent light providing means. The at least one means for attracting fleas and the like can be a heat discharging means. The at least one means for attracting fleas and the like could alternatively be a light providing means and a heat discharging means. The device could further be made up of a soap retaining and discharging means.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. A new and improved device for trapping and killing fleas and other small insects, comprising:
   a reservoir adapted to be filled with a liquid substance adapted to kill fleas and other small insects upon contact, said reservoir being in the form of a container having a central recess for holding said liquid substance, said container having a front wall, a rear wall and first and second opposed side walls; said rear wall having a central portion jutting in a direction toward said central recess and said front wall to define a horizontal support surface adjacent the central recess of said container and proximal to said rear wall thereof;
   an elongated illumination source removably mounted on said support surface and extending upwardly and orthogonally with respect to said horizontal support surface, said illumination source adapted to be energized by an external source of electricity to emit a light attractive to fleas or other small insects, and
   backboard means for extending upwardly and orthogonally from said rear wall behind said central jutting portion and for extending substantially the full transverse dimension determined by the distance between said first and second side walls of said container, said backboard means having a vertical extent above said horizontal support surface substantially equal to the elongated extent of said illumination source above said horizontal support surface whereby fleas or other small insects attracted to said illumination source hits said back board means and falls into said central container recess.

2. The device of claim 1 further including means for removably supporting said backboard means on said rear wall of said container behind said jutting out central section.

3. The device of claim 2 wherein said means for removably supporting comprises spring clip means for receivably engaging an edge of said backboard means, said spring clip means being affixed to said rear wall of said container.

4. The device of claim 1 wherein said illumination source has a pair of substantially flat opposed ends, horizontal support surface on said jutting out central portion includes upstanding plug means, and at least one of said opposed ends of said illumination source means has a receptacle for receivably and removably mounting said illumination source on said plug means and said horizontal support surface.

* * * * *